July 23, 1963

L. R. HETZLER 3,098,964

TRANSISTOR REGULATOR FOR GENERATORS

Filed Aug. 22, 1958

INVENTOR.
Lewis R. Hetzler
BY
His Attorney

July 23, 1963   L. R. HETZLER   3,098,964
TRANSISTOR REGULATOR FOR GENERATORS
Filed Aug. 22, 1958   4 Sheets-Sheet 2

INVENTOR.
Lewis R. Hetzler
BY
His Attorney

July 23, 1963 L. R. HETZLER 3,098,964
TRANSISTOR REGULATOR FOR GENERATORS
Filed Aug. 22, 1958 4 Sheets-Sheet 3

INVENTOR.
Lewis R. Hetzler
BY
His Attorney

INVENTOR.
Lewis R. Hetzler.
BY
His Attorney.

United States Patent Office 3,098,964
Patented July 23, 1963

3,098,964
TRANSISTOR REGULATOR FOR GENERATORS
Lewis R. Hetzler, Anderson, Ind., assignor to General Motors Corporation, Detroit, Mich., a corporation of Delaware
Filed Aug. 22, 1958, Ser. No. 756,685
18 Claims. (Cl. 322—28)

This invention relates to voltage regulators, and more particularly to voltage regulators wherein one or more transistors are used to control the current flow through the control winding of a power source. A regulator of the type described could be used with D.C. machines, straight A.C. machines with D.C. excitation, or A.C. machines with rectified D.C. output.

This application is a continuation-in-part of copending application Serial No. 707,200, filed January 6, 1958, and assigned to the assignee of this invention, and now Patent No. 2,945,174.

It is an object of this invention to provide a voltage regulator circuit wherein a transistor or transistors is connected in circuit with a control winding of a power source and wherein the transistor or transistors are rendered substantially either fully non-conductive or fully conductive in response to voltage fluctuations of the power source, so as to provide for minimum heat loss in the transistor or transistors. The circuit for rendering the transistor either fully conductive or fully non-conductive includes a circuit element that has a substantially constant voltage drop thereacross with varying current therethrough, thus permitting the use of smaller biasing resistors in the transistor circuit to reduce the heating effect of the biasing resistors and thus reduce the overall heat generation of the regulator.

The circuit element described above preferably takes the form of a silicon diode that is connected in series with the controlling transistor or transistors and in series with the control winding of the direct-current power source. With such an element the voltage drop across it is adequate for biasing purposes during periods of non-conduction by the transistors, while during periods of conduction the voltage drop across and the heat produced in the element is less than in prior regulator circuits.

It is another object of this invention to provide a regulator circuit for a direct-current power source having a control winding wherein a pair of parallel-connected transistors are connected in series with the control winding of the D.C. power source and wherein the series-connected paralleled transistors and control winding are connected across the output terminals of the D.C. power source, the conduction of the transistors being controlled in response to voltage variation appearing across the output terminals. A pair of equalizing resistors are preferably connected in the base circuit of the paralleled transistors to insure equalization of current flow through the transistors and thus insure equal division of control winding current through the transistors.

Still another object of this invention is to provide a voltage regulating circuit for a direct current power source that includes a first power output transistor that controls energization of a control winding of the power source, and wherein a second driver transistor controls the conduction of the power output transistor, and further, wherein a bias resistor is connected between one power output lead and an electrode of the driver transistor for biasing the driver transistor to its non-conductive state during the time that the power output transistor is conducting.

Another object of this invention is to provide a compact mounting arrangement for the component parts of a transistor regulator circuit. This object is accomplished in part by connecting certain of the component parts of the regulator together by means of a printed circuit board which also serves to support certain of the component parts.

A further object of this invention is to provide a transistor regulator wherein certain of the transistors of the regulator are mounted in heat transfer relationship with a heat sink member that conducts heat away from the transistors.

From the foregoing, it is apparent that this invention contemplates providing a transistor voltage regulator wherein the heat losses of the component parts of the regulator are reduced to a minimum and wherein the voltage drops in the regulator components that are in series with the control winding of the source are reduced to a minimum. Because of the efficient operation of the regulator of the invention, it is ideally suited for controlling the generator of a motor vehicle that is driven at widely-varying speeds and wherein only relatively low voltages are available.

Further objects and advantages of the present invention will be apparent from the following description, reference being had to the accompanying drawings wherein a preferred embodiment of the present invention is clearly shown.

Figure 1:
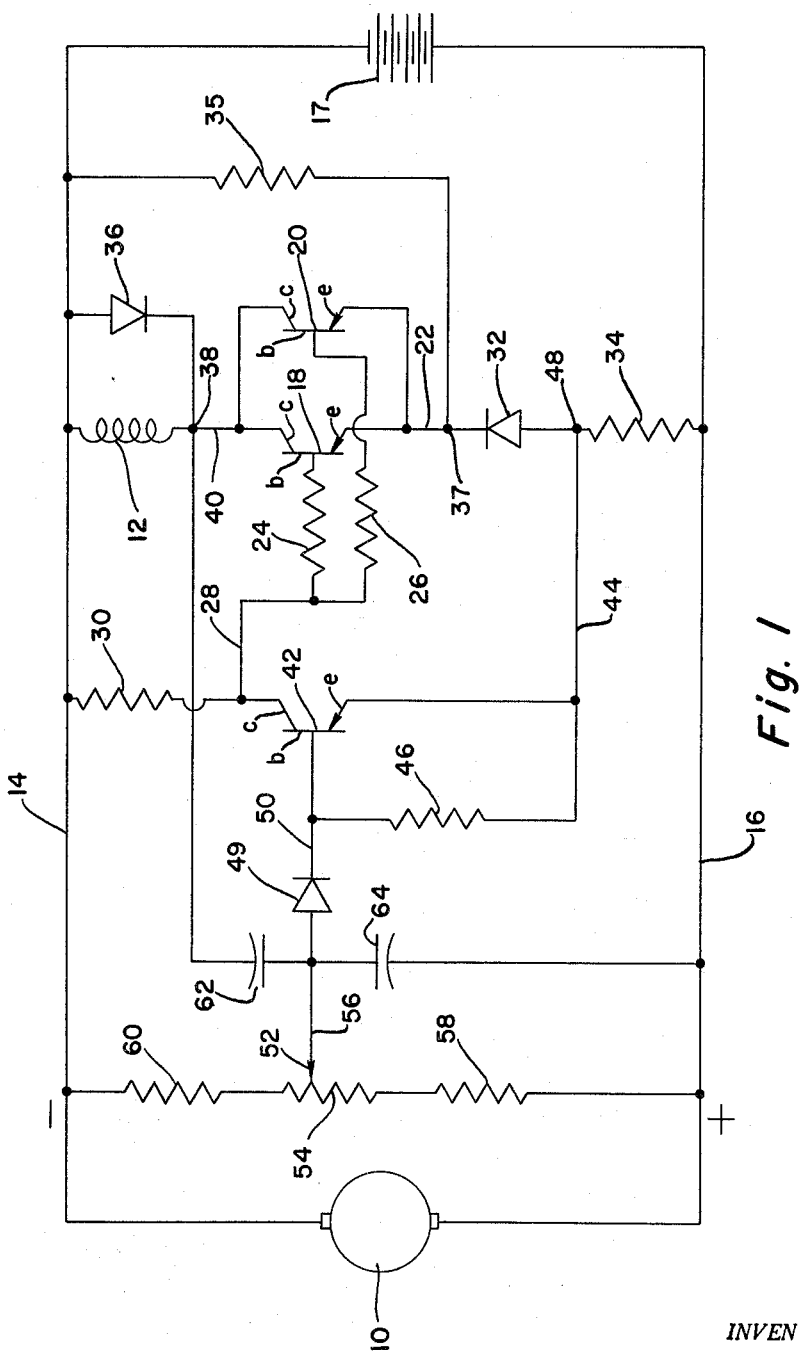
FIGURE 1 is a circuit diagram of a voltage regulator circuit made in accordance with this invention.

The regulator circuit to be described is an improvement over the regulator circuit shown in copending application Serial No. 621,833, filed November 13, 1956.

Referring now to the drawing, a direct-current generator having an armature 10 and a shunt field winding 12 is shown. The output terminals of the armature are connected with output leads 14 and 16 which form a two-terminal D.C. output circuit that feeds a storage battery 17 and other loads (not shown). The circuit to be described is not limited for use with a direct-current generator and will work equally as well with an A.C. generator that is provided with suitable rectifiers, and is useful in A.C. generators having D.C. excitation. Where an A.C. generator and rectifiers are used, the output terminals of the rectifier or rectifiers are connected with leads 14 and 16 and the field winding of the A.C. generator is connected in the circuit in a manner identical with the connection of field winding 12 in the circuit shown. In the circuit illustrated, the armature 10 is adapted to be driven by the engine of a motor vehicle (not shown) and where an A.C. generator is used the rotor of the generator is driven by the engine of a motor vehicle.

One side of the field winding 12 is connected directly to lead 14 while the other side of the field winding is connected to the collectors $c$ of parallel-connected transistors 18 and 20. The emitters $e$ of transistors 18 and 20 are connected together and to a lead 22. The bases $b$ of transistors 18 and 20 are connected respectively with equalizing resistors 24 and 26 which have the same resistance value. The opposite sides of the resistors 24 and 26 are connected together and to a lead 28. The equalizing resistors insure an equal division of base current flow through the transistors in the event the voltages appearing across the base and emitter of the transistors become unequal.

The lead 28 that is connected with resistors 24 and 26 is connected to one side of a resistor 30 that has its other side connected directly to lead 14. The lead 22 that is connected with the emitters of transistors 18 and 20 is connected to one side of a silicon diode 32 that is in turn connected to one side of a feedback resistor 34 that has its opposite side connected directly to output lead 16. A diode 36 has one side connected to output lead 14 and has its other side connected to junction 38 that is connected to a lead 40 that connects one side of field winding 12 with the collectors of transistors 18 and 20. The diode 36 operates to dampen voltage surges appearing across field winding 12. A resistor 35 is connected between junction 37 and outline line 14.

The silicon diode 32 has the characteristic of having a substantially constant voltage drop thereacross with variation of current flow therethrough in a forward direction. By employing this peculiar characteristic of a silicon diode, it is possible to greatly reduce the heating effect of certain of the circuit elements of the regulator as will become more readily apparent hereinafter.

The regulator circuit illustrated is designed to control the current in field winding 12 and thus regulate the output voltage of armature 10, by varying the conductivity of paralleled transistors 18 and 20. The transistors 18 and 20 by the circuit illustrated are either operated substantially fully non-conductive or fully conductive. This mode of operation is used because it has been found that the heating effect of transistors 18 and 20 may be reduced to a minimum by operating them either fully non-conductive or fully conductive. Since the emitter-to-collector currents of transistors 18 and 20 depend upon the emitter-to-base currents of these transistors, it will be apparent that the conduction of these transistors may be controlled by controlling their base currents. In this connection, it should be noted that resistors 24, 26 and 30 are chosen to have values that will provide a sufficient base current in transistors 18 and 20 to provide maximum collector current in these transistors. This base current flows from emitter to base in the transistors and thence respectively through resistors 24 and 26 and through resistor 30 to line 14.

The conduction of transistors 18 and 20 is controlled by a transistor 42 having a base $b$, an emitter $e$, and a collector $c$. The collector $c$ of transistor 42 is connected to one side of resistor 30 while the emitter $e$ of transistor 42 is connected to a lead 44 which is, in turn, connected to one side of a resistor 46 and to junction 48 located between silicon diode 32 and resistor 34. The base $b$ of transistor 42 is connected to one side of a Zener diode 49 by a lead 50 that is also connected to one side of resistor 46. The Zener diode has the characteristic of preventing current flow therethrough in a reverse direction until a predetermined voltage is applied thereacross, whereupon the diode breaks down to permit current flow in a reverse direction. The opposite side of Zener diode 49 is connected to an adjustable tap 52 on a resistor 54 by means of a lead 56. The resistor 54, together with resistors 58 and 60, form a series-connected voltage divider network that is connected directly across output leads 14 and 16. A condenser 62 is connected between lead 56 and junction 38 and another condenser 64 is connected between lead 56 and output lead 16.

As noted hereinbefore, the conduction of transistor 42 from emitter to collector controls the conduction of transistors 18 and 20. This action is due to the fact that the transistor 42 operates as a variable resistance which shunts current around the emitter-to-base path of transistors 18 and 20. As this shunting action varies, the emitter-to-base currents of transistors 18 and 20 are changed from maximum to essentially zero, and this action results in changing the emitter-to-collector currents of transistors 18 and 20 from a maximum to essentially zero. Of course, the magnitude of base current change in transistor 42 is much less than the magnitude of field current change due to the amplification of the two-stage transistor amplifier.

Connected across output leads 14 and 16 is a voltage divider network comprised of resistors 58, 54 and 60. A voltage sensing loop consisting of Zener diode 49, base-to-emitter circuit of transistor 42 as shunted by resistor 46, and feedback resistor 34 has applied to it that portion of line voltage across resistor 58 and resistor 54 up to tap 52. Resistance values of 58, 54 and 60 are chosen so that the voltage sensed by the loop is of the order of magnitude of the breakdown of the Zener diode when voltage across leads 14 and 16 is at the desired level. Changes in voltage across leads 14 and 16 produce similar changes in voltage across diode 49. Since the conductivity of the diode is influenced by the voltage across it, as previously indicated, the emitter-to-base current of transistor 42 and consequently the emitter-to-collector current of transistor 42 depend on these voltage changes.

When the voltage across leads 14 and 16 is below the desired level, no current flows in the sensing loop, transistor 42 is non-conducting and full field current is supplied through paralleled transistors 18 and 20. When line voltage exceeds the desired value, diode 49 becomes conductive permitting emitter-to-base current in transistor 42 and therefore emitter-to-collector current in transistor 42. This shunts off almost all the base currents in transistors 18 and 20, and the collector currents in 18 and 20 which make up the current in the generator field are reduced to practically zero. The transistors 18 and 20 are therefore operated either fully conductive or fully non-conductive, this mode of operation being due primarily to the particular connection of diode 32 and resistor 34 with the remainder of the regulator circuit. The action of the silicon diode will be described first.

The silicon diode, which has a substantially constant voltage thereacross with varying current therethrough, is connected in series with both resistor 35 and transistors 18 and 20. When transistors 18 and 20 are non-conductive, the resistor 35 provides a current path for current flow between leads 14 and 16 and through silicon diode 32. With current passing through diode 32, a voltage drop is developed thereacross which is of a magnitude to equal or slightly exceed the minimum voltage across emitter to collector of transistor 42. With transistor 42 conducting, this voltage developed across the diode tends to completely shut off transistors 18 and 20 as the potential of the bases of transistors 18 and 20 approaches or exceeds the potential of the emitters of transistors 18 and 20 to cut off the base current of these transistors. With the base current cut off in transistors 18 and 20, the collector current is likewise reduced to substantially zero to render the transistors 18 and 20 substantially non-conductive.

It is of particular importance that the circuit element 32, which is a silicon diode in this case, have a substantially constant voltage thereacross with change in current flow therethrough. Since the full field current for the generator must pass through circuit element 32, it is necessary to keep its resistance quite low so that the voltage drop thereacross will not become excessive. If a resistor is used as circuit element 32, resistor 35 must conduct considerable current to develop enough bias voltage across element 32 when transistors 18 and 20 are non-conducting. With such an arrangement, resistors 32 and 35 become sources of considerable heat.

By employing the unique voltage drop properties of a silicon junction rectifier, this heating can be greatly reduced. In the direction of normal conduction, the forward direction, the voltage drop across the silicon diode remains substantially the same from very small currents to large currents. With the use of diode 32, resistor 35 need only conduct a very small current to develop an adequate bias voltage across the diode when transistors 18 and 20 are non-conducting. On the other hand, when full current is being passed to the field 12 by transistors 18 and 20, the voltage drop across diode 32 does not become excessive. The circuit thus has two important advantages; the reduction in size and heating effect of resistor 35, and reduced voltage drop in the field circuit during conduction of field current.

The feedback resistor 34 is a part of the previously referred to voltage sensing loop which senses the voltage appearing across resistor 58 and the lower portion of resistor 54.

To analyze the circuit operation, assume that the generated voltage is high and hence the field current will be cut off to essentially zero. For this reason the voltage across resistor 34 is essentially zero. Since the voltage across leads 14 and 16 is high, Zener diode 49 will permit a large control current to pass through the emitter-to-base circuit of transistor 42. With the field current at zero, the regulated voltage will start to drop and through the normal control action previously described, the field current will begin to increase. When the field current begins to increase, the voltage drop across the feedback resistor 34 will also start to increase. This feedback voltage is connected into the voltage sensing loop in such a manner that it subtracts from the sensed voltage, giving an indication that the voltage is dropping faster than it actually is. This will call for more field current and the process continues until the field current cannot increase further due to the resistance of the field.

Assuming that the generator capacity is adequate, the regulated voltage will start to rise with full field applied. When the regulated voltage has increased to a point where the sensed voltage less the feedback voltage will result in the proper control current through the voltage diode 49, the field current will begin to be reduced. The action is now reversed in that the voltage across resistor 34 will drop so that less voltage is subtracted from the sensed voltage resulting in further lowering of field current, and so on until the field current is driven to zero. The action of switching the field current on and off is extremely fast and, therefore, no appreciable time is spent in the one-half or intermediate current range where the transistor might heat. To further insure that this is the case, the capacitor 62 is used to feed back a transient voltage into the sensing circuit during switching to accelerate the action. The capacitor 64, which is connected between line 56 and lead 16, is intended to smooth the sensed voltage so that only D.C. appears across the transistor input.

Referring now more particularly to FIGURES 2 through 6, a preferred physical embodiment of the regulator circuit shown in FIGURE 1 is illustrated. The same reference numerals have been used in all the figures to identify identical or equivalent parts. It is to be understood that the physical structure shown in FIGURES 2 through 6 does not include the power source 10, its control winding 12, or the battery 17 as they are not a part of the regulator.

Figure 6:
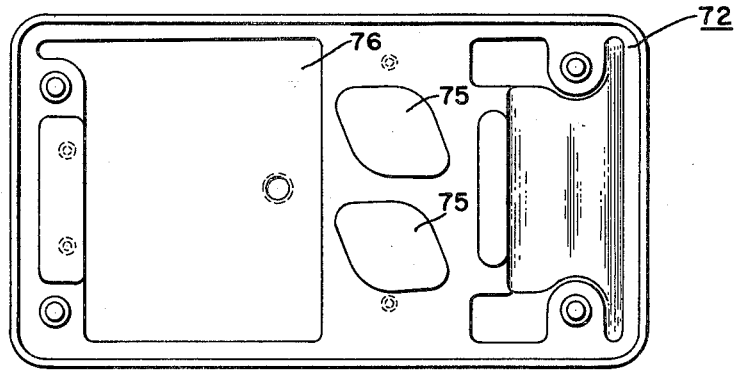
FIGURE 6 is a plan view on a reduced scale of the underside of the cover member of the regulator illustrated in FIGURE 2.

The regulator structure comprises a base 70 that is formed of suitable metal material such as die-cast aluminum and which carries a plurality of mounting brackets 71. A cover member generally designated by reference numeral 72 is fastened to the base 70 by suitable threaded fastener members 73. The cover member is formed of suitable heat conducting material, such as die-cast aluminum, and has integrally-formed heat-conducting fins designated as a whole by reference numeral 74. These fins conduct heat away from the cover member 72 and away from the heat-generating parts of the regulator. The cover member as is best illustrated in FIGURE 6 is formed with a pair of pockets 75 that fit over transistors 18 and 20 when the cover is in place on the base. The cover member also has a recessed area 76 that encloses certain parts of the regulator when the cover member is in place on the base.

The cover member 72 carries a panel assembly generally designated by reference numeral 78. The panel assembly includes a sheet or board of suitable electrical insulating material 79 that carries a printed circuit and various other component parts of the regulator as will become more readily apparent hereinafter. The panel assembly 78 is held to cover member 72 by screws 80 and 81. The screws 80 pass through a metal heat sink member 82 that is formed of a heat-conducting metal such as aluminum. These screws are electrically insulated from heat sink member 82 by an insulator bushing 83 formed of suitable electrical insulating material. The cover member 72 is also electrically insulated from heat sink member by a sheet of insulating material 84. The screws 81 pass through a second metal heat sink member 85 that is formed of copper or the like. This heat sink member is electrically insulated from screws 81 by insulating material 86 and is electrically insulated from heat sink member 85 by a sheet of insulating material 87.

Figures 2, 3:
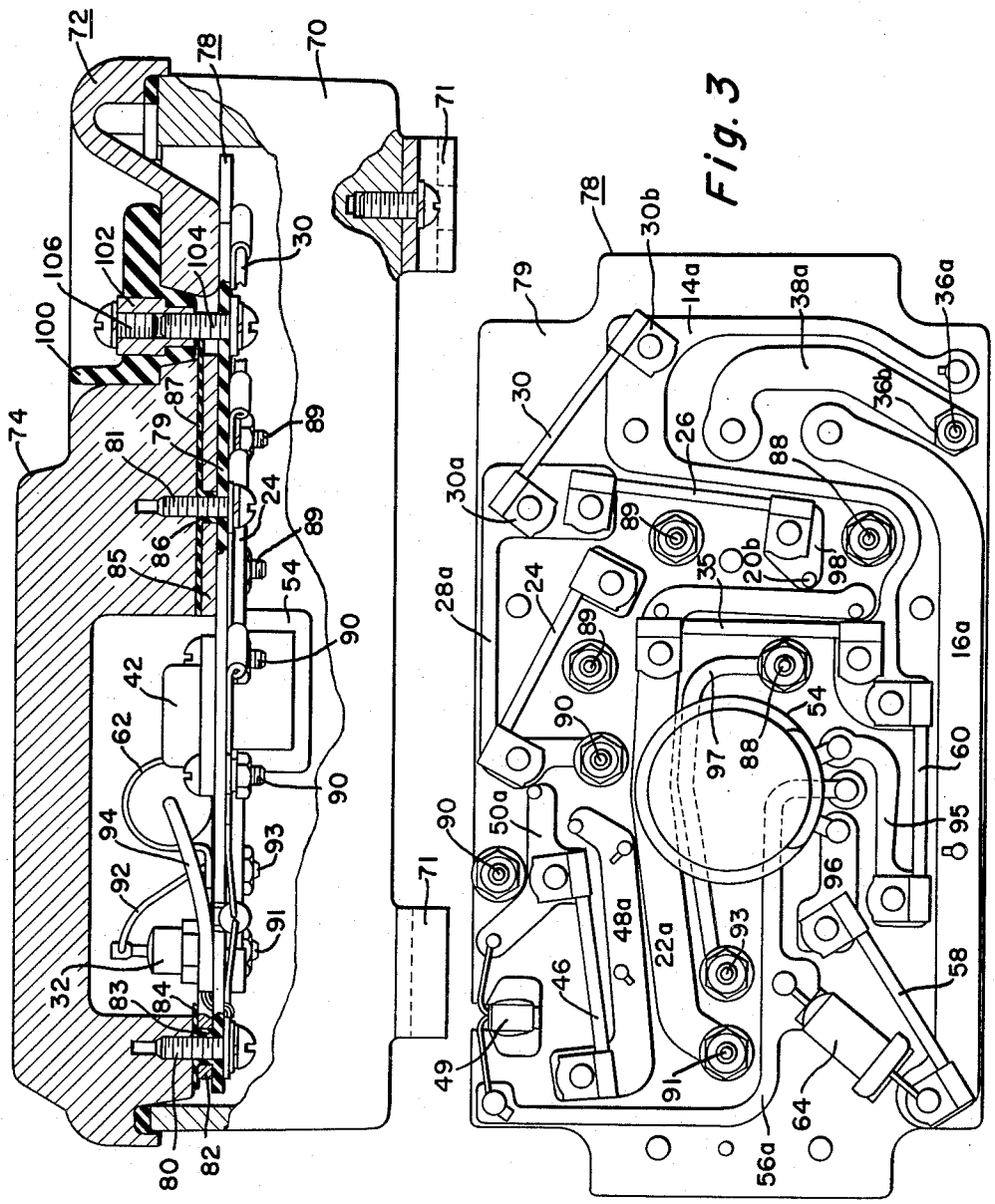
FIGURE 2 is a side view with parts broken away of voltage regulator made in accordance with this invention and illustrating the physical construction of the circuit shown in FIGURE 1.
FIGURE 3 is a plan view of one side of a panel assembly that forms a component part of the regulator illustrated in FIGURE 2.
Figure 4:
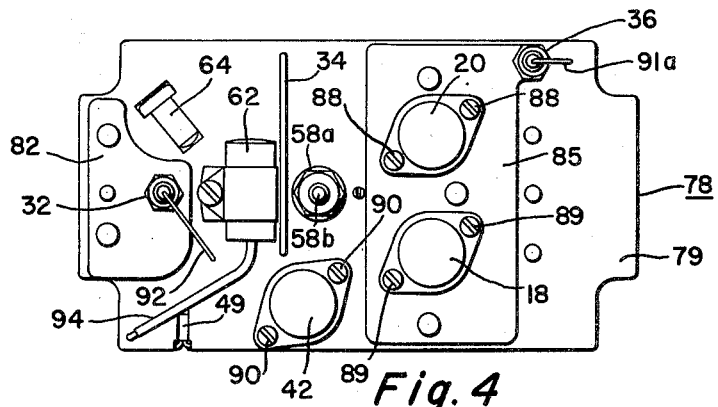
FIGURE 4 is a plan view on a reduced scale of the opposite side of the panel illustrated in FIGURE 3 from the side shown in FIGURE 3.
Figure 5:
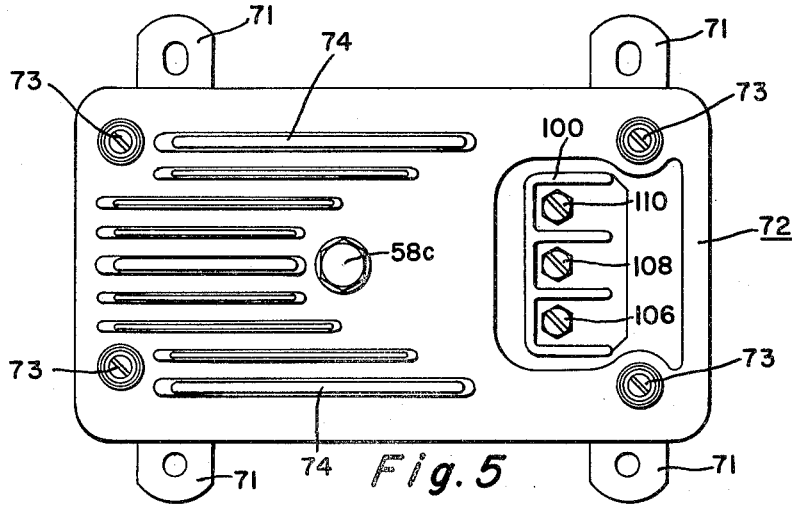
FIGURE 5 is a top view on a reduced scale of the regulator shown in FIGURE 2.

Referring now more particularly to FIGURE 4, it is seen that the top side of panel board 78 carries various components of the circuit shown in FIGURE 1. The power transistors 18 and 20 rest on the heat sink member 85 and are held thereon by screws 88 and 89 which are threaded into suitable nuts as shown in FIGURE 3. The transistors 18 and 20 are of the conventional P-N-P type having a metal heat conducting base that is in contact with heat sink 85 so that heat generated at the junction of the transistor is transferred to heat sink 85. The metal base and case of the transistors is the collector electrode of the transistors and these electrodes are connected together by heat sink 85. The collectors of transistors 18 and 20 are thus connected together as is shown in FIGURE 1.

The heat sink 85 is electrically and thermally connected to one side of the silicon diode 36 that has a stud 36a that passes through the heat sink member and which is held to conductor strip 38a by a nut 36b. This stud forms one terminal side of the diode 36 while the other side of the diode is connected with a lead 91a that connects with conductor strip 14a of a printed circuit formed on the underside of board 79. The diode 36 is thus electrically and thermally connected with heat sink 85 and the heat generated by the diode is transferred to the heat sink.

The board 79 carries the transistor 42 that controls the conduction of power transistors 18 and 20. This transistor is secured to panel 79 by screws 90 that are threaded into suitable nuts as shown in FIGURE 3. The metal case of transistor 42 is the collector electrode of the transistor and is thus connected to the screws 90. The base and emitter electrodes of transistor 42 (not shown) pass through the panel 79 and are connected to certain portions of the printed circuit located on the underside of the panel.

The heat sink member 82 carries the silicon diode 32. This diode has a threaded stud 91 that passes through heat sink 82 and board 79 and which is held in place by a nut as shown in FIGURE 3. The stud is one terminal side of the diode and is connected to a part of the printed circuit on the underside of panel 79. The opposite side of diode 32 is connected by a wire 92 to the printed circuit. The diode 32 is thus connected in thermal exchange relationship with the heat sink 82 and the heat generated by the junction of the diode is conducted to heat sink 82.

The panel 79 also carries Zener diode 49, condensers 62 and 64, and variable resistor or potentiometer 54.

The condenser 62 is held in place by a screw or bolt 93 that also forms one terminal connection of the condenser. The other terminal side of the condenser is formed by a lead wire 94. The panel board also supports the resistor 34 that takes the form of a length of resistance wire.

The underside of panel or board 79 as is shown in FIGURE 3 is formed as a printed circuit. This printed circuit includes the flat metal conductor strips 14a, 16a, 22a, 28a, 38a, 48a, 50a, and 56a that are cemented or otherwise secured to the panel board. These conductor strips correspond respectively to leads 14, 16, 22 and 28, terminals 38 and 48, and leads 50 and 52 shown in FIGURE 1. The conductor strips 95, 96 and 97 are likewise cemented or otherwise secured to panel 79.

The resistor 30 has terminal ends 30a and 30b that are soldered respectively to conductor strips 28a and 14a. This resistor is of the wire-wound type but may be of other types well known to those skilled in the art. In a like manner, one side of resistor 26 is connected to conductor strip 28a. The opposite side of resistor 26 is connected to a conductor strip 98 that is, in turn, connected with the base electrode 20b of transistor 20. This electrode passes downwardly from transistor 20 through suitable openings (not shown) formed in heat sink 85 and panel 79. The emitter electrode of transistor 20 in a like manner is connected with conductor strip 22a. The base and emitter electrodes of transistor 18 also pass downwardly through heat sink 85 and panel 79 and are connected respectively with one side of resistor 24 and to conductor strip 22a. These connections are all made by a soldering operation as is indicated by the dots in FIGURE 3.

The greater portion of the remainder of the circuit connections on the underside of panel 79 are also made by a soldering operation as described above. Thus, resistor 24 is connected between conductor strip 28a and the base of transistor 20, resistor 46 between conductor strips 48a and 50a, resistor 58 between conductor strips 16a and 96, resistor 60 between conductor strips 14a and 95, and resistor 35 between conductor strips 14a and 22a. The Zener diode 49 is connected between conductor strips 50a and 56a, as shown, while condenser 64 is connected between conductor strips 16a and 56a. The bolt 93 that forms one side of condenser 62 is connected to conductor strip 97 while the terminal 94 of this condenser passes through panel 79 and is soldered to conductor strip 56a. The collector electrode of transistor 42, which is the case of the transistor, is connected by one of the bolts 90 to the conductor strip 28a. The base and emitter electrodes of transistor 42 pass through panel 79 and are connected respectively with conductor strips 50a and 48a by a soldering operation. The terminals of variable resistor 54 are connected with conductor strips 56a, 95 and 96. This resistor has a threaded shank that passes through board 79 and which is engaged by a nut 58a. The resistor has an adjusting shaft 58b which may be adjusted by rotation of nut 58c rotatably mounted in cover member 72. This nut preferably has a shaft (not shown) that has a detachable connection with shaft 58b. The rotation of shaft 58b adjusts the resistance value of resistor 54. The resistor 34 has ends that project through panel 79 and which are connected respectively to conductor strips 48a and 16a.

The cover member 72 is fitted with an insulator block 100. The insulator block has three openings which respectively receive a brass insert member 102 that is threaded internally. These brass inserts are connected respectively with conductor strips 14a, 16a and 38a by means of screws 104. These screws serve to make an electrical connection between the brass inserts and the conductor strips and also serve to hold the brass insert and insulator block in place on cover member 72. The brass inserts are respectively provided with screws 106, 108 and 110, that are threaded into the top end of the inserts. These screws are used to connect the regulator with a power source and the control winding of the power source. The terminal 106 is a negative terminal, the terminal 108 a field terminal, and the terminal 110 is the positive terminal.

From the foregoing it will be apparent that the applicant has provided a very compact transistor regulator that is not likely to get out of order. The transistors and other circuit elements are operated relatively cool, due to the design of the circuit of FIGURE 1 and due to the provision of heat sinks and a finned housing for the regulator. It will be appreciated that the heat sinks and finned housing provide for conduction of heat away from the regulator to the surrounding atmosphere it is operating in.

Figure 7:
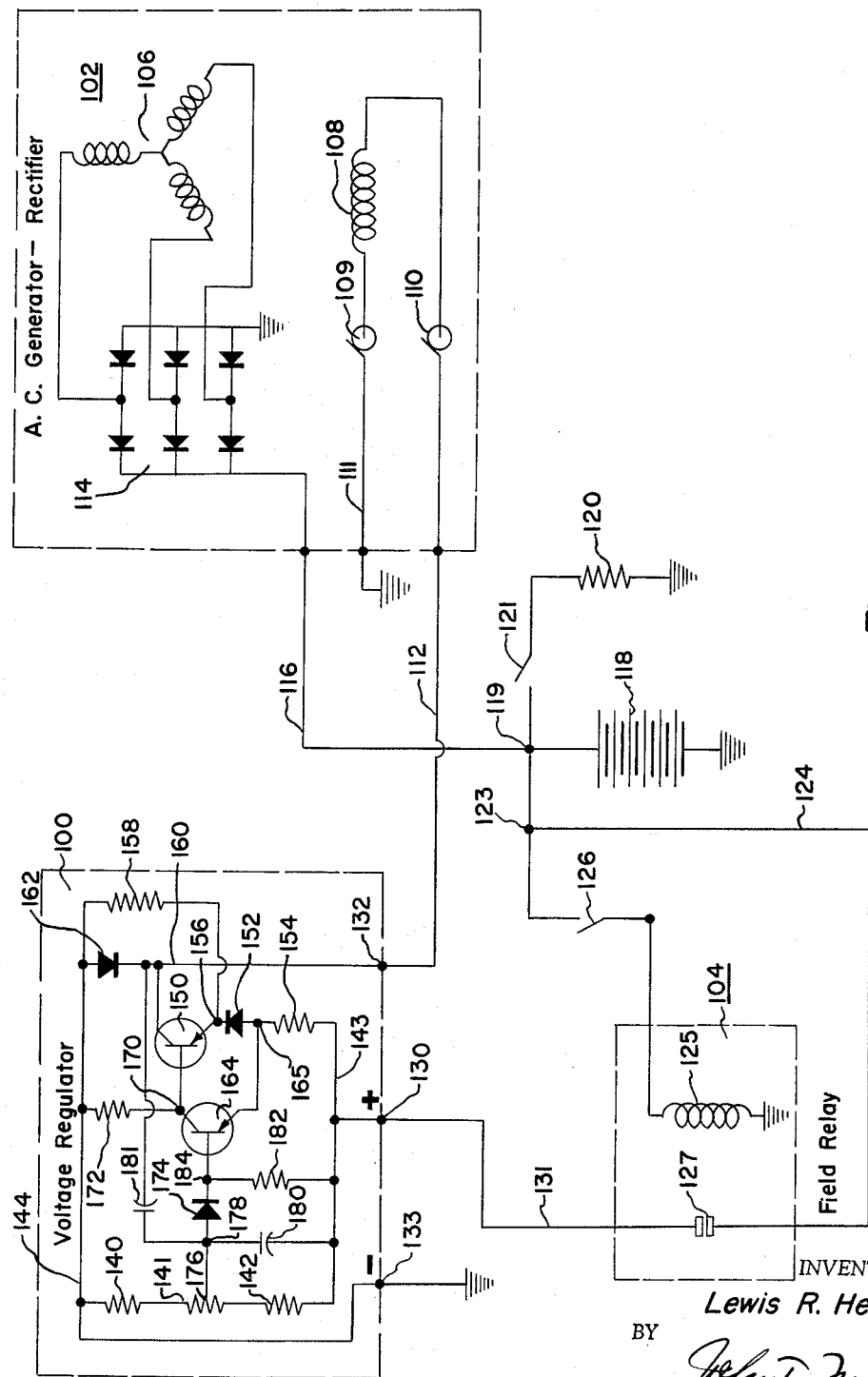
FIGURE 7 is a circuit diagram of a modified voltage regulator circuit made in accordance with this invention.

Referring now to FIGURE 7, a modified transistor voltage regulator designated in its entirety by reference numeral 100 is shown connected with an A.C. generator-rectifier combination generally designated by reference numeral 102. The regulator and generator-rectifier are also connected in circuit with a field relay generally designated by reference numeral 104. The voltage regulator 100 is substantially identical with regulator shown in FIGURE 1 with the exception that only one transistor is used for controlling the current through the field winding of the generator and the emitter-base circuit of the transistor 42 is modified so that it is no longer shunted directly by a resistor.

The A.C. generator-rectifier combination of FIGURE 7 includes an A.C. generator having a three-phase Y-connected output winding or stator designated in its entirety by reference numeral 106. The generator has a rotatable field winding 108 that may be driven by a suitable internal combustion engine of a motor vehicle. The field winding is connected through slip rings 109 and 110 with leads 111 and 112. The lead 111 is connected directly to ground as shown. The three-phase output winding 106 is connected with a three-phase full wave bridge rectifier designated in its entirety by reference numeral 114. One side of the bridge rectifier is connected directly to ground whereas the opposite side of the bridge rectifier is connected with a lead 116.

The circuit of FIGURE 7 further includes a storage battery 118 that has one side grounded and which has its other side connected with junction 119. The electrical energizable loads of the motor vehicle are designated by reference numeral 120 and are connected between the junction 119 and ground through a switch 121. The junction 119 is connected with lead 116 and is also connected with a junction 123. The junction 123 is connected with a lead 124 and is also connected to one side of a relay coil winding 125 of the field relay 104 through an ignition switch 126. The opposite side of the relay coil 125 is connected directly to ground and the coil operates to magnetically close relay switch contacts 127 whenever the coil 125 is energized. One side of the relay switch contacts 127 are connected with lead 124 whereas the opposite side of the relay switch contacts are connected with a positive junction terminal 130 through a lead 131. The lead 112 that is connected with slip ring 110 is connected with the junction 132 of voltage regulator 100 which has another terminal 133 connected directly to ground. The regulator 100 as has been noted above is substantially identical with the regulator circuit illustrated in FIGURE 1 as will be readily apparent from an inspection of two figures. Thus, the regulator 100 includes a voltage divider network comprised of resistors 140, 141 and 142 which correspond respectively to resistors 54, 58 and 60 of FIGURE 1. The resistors 140, 141 and 142 are connected between leads 143 and 144. The lead 144 is at ground potential as it is connected to terminal 133 whereas the lead 143 is at a positive potential due to its connection with terminal 130.

The field circuit through the voltage regulator which controls current flow through field winding 108 includes the transistor 150, a silicon diode 152 and a resistor 154. The emitter electrode of transistor 150 is connected directly to junction 156 which connects with one side of resistor 158 and one side of silicon diode 152. It will be appreciated that the transistor 150, silicon diode 152, resistor 154 and resistor 158 correspond respectfully to transistors 18 and 20, silicon diode 32, and resistor 34 and resistor 35 of the circuit shown in FIGURE 1.

In a manner similar to the circuit shown in FIGURE 1, the transistor 150 has a collector electrode connected with a lead 160 which is connected between terminal 132 and one side of rectifier 162. A transistor 164 which is equivalent to the transistor 42 shown in FIGURE 1 has its emitter electrode connected with the junction 165 located between silicon diode 152 and resistor 154. The collector electrode of transistor 164 is connected with a junction 170 which is in turn connected with the base electrode of transistor 150 and to one side of resistor 172.

A Zener diode 174 which is equivalent to the diode 49 shown in FIGURE 1 is connected between the base electrode of transistor 164 and a tap-off point 176 of resistor 141. One side of Zener diode 174 is also connected to junction 178 which is in turn connected to one side of condensers 180 and 181. The opposite side of condenser 180 is connected with lead 143 whereas the opposite side of condenser 181 is connected to lead 160 as is shown. It will be appreciated that the condensers 180 and 181 correspond respectively to the condensers 64 and 62 illustrated in FIGURE 1.

In the voltage regulating circuit of FIGURE 7 a resistor 182 is shown connected between junction 184 and lead 143, and no resistor is shown connected between junction 184 and junction 165. In this respect, the circuit of FIGURE 7 is different from the circuit of FIGURE 1 and the purpose of this particular connection will be more fully described hereinafter.

The operation of the circuit of FIGURE 7 with particular emphasis on the voltage regulating circuit will now be described. The voltage regulating circuit generally designated by reference numeral 100 operates in a fashion substantially identical with the operation of the circuit shown in FIGURE 1 in that the transistor 150 controls current flow through the field 108. Thus, when ignition switch 126 is closed, the relay coil 125 is energized to close contacts 127. The closure of contacts 127 connects the junction 119 with the positive terminal 130 of the voltage regulator 100. This applies battery potential across leads 143 and 144 of the regulator and applies the output potential of bridge rectifier 114 across these leads when the generator develops an output voltage. When the output voltage of the generator is above a predetermined desired value, the voltage between point 176 and lead 143 is of such a value as to cause the Zener diode 174 to break down in a manner described in connection with the circuit of FIGURE 1. This causes base current to flow in transistor 164 between lead 143 and junction 176. With base current flowing in transistor 164 the transistor is turned on from emitter to collector to shunt current away from transistor 150 and thus substantially cut off the conduction of transistor 150 to cut off field current flow through field winding 108. When the voltage is below a predetermined desired value, the voltage applied across Zener diode 174 is insufficient to cause the breakdown of the diode and therefore the transistor 164 is rendered substantially fully non-conductive as has been more fully described in connection with the operation of the circuit as shown in FIGURE 1. When transistor 164 is rendered substantially non-conductive, the transistor 150 becomes substantially fully conductive to increase the field current through the field winding 108. The operation of the transistors 164 and 150 with the remainder of the circuit with respect to applied voltage across Zener diode 164 is thus substantially the same as the operation shown in FIGURE 1 which has been fully described.

The difference in operation between the circuits shown in FIGURES 1 and 7 is a result of the placement of resistor 182 between junction 184 and lead 143. This resistor operates to insure that the transistor 164 will remain non-conductive during the time that transistor 150 is fully conductive. Thus, assuming that transistor 150 is fully conductive, the junction point 165 will be at a lower potential than lead 143 due to the voltage drop across resistor 154. The emitter electrode of transistor 164 being connected directly with the junction 165 will be at the same potential as junction 165 at this time. The junction 184 at this time will be at substantially the same potential as lead 143 due to the fact that at this time the Zener diode 174 is non-conductive. With the potential at junction 184 being substantially equal to the potential of lead 143, it is seen that the base electrode of transistor 164 becomes positive with respect to the emitter electrode thereof. Thus, a back bias voltage is applied to the transistor 164 to prevent base current flow therethrough whenever the transistor 150 is fully conductive. It is, of course, readily apparent that transistor 150 becomes fully conductive whenever the regulated voltage is of such a value as to not cause the breakdown of Zener diode 174. It can be seen from the foregoing that the particular connection of resistor 182 has highly beneficial results in that it applies a back bias voltage to transistor 164 at the time that it is desired to have this transistor non-conductive.

While the embodiments of the present invention as herein disclosed constitute preferred forms, it is to be understood that other forms might be adopted.

What is claimed is as follows:

1. A control circuit for a power source having a control winding that varies the output voltage of said source in response to current flow therethrough comprising, a D.C. output circuit connected with said power source, a transistor, a circuit element having a substantially constant voltage drop thereacross with varying current flow therethrough, means connecting said transistor, control winding and circuit element in series circuit relationship and across said D.C. output circuit, a voltage sensing circuit connected across said D.C. output circuit developing a voltage which is proportional solely to the voltage appearing across said D.C. output circuit, means connected with said sensing circuit and with said transistor for controlling the conduction of the transistor in response to voltage change across said D.C. output circuit, and means for at times connecting said circuit element across the base and emitter of said transistor in such a direction that the voltage appearing across said circuit element opposes current flow from emitter to base in said transistor to substantially fully cut off conduction of said transistor.

2. A control circuit for a power source having a control winding that varies the output voltage of said source in response to current flow therethrough comprising, a D.C. output circuit connected with said power source, a transistor having a base, emitter and collector, a diode having a substantially constant voltage drop thereacross with varying current flow therethrough, means connecting said transistor, control winding and diode in series circuit relationship with one another and across said D.C. output circuit, a transistor by-pass circuit connected in series with said diode and across said D.C. output circuit and in shunt with said transistor, a voltage sensing circuit connected in circuit with said D.C. output circuit, means connected with said sensing circuit and with said transistor for controlling the conduction of the transistor in response to voltage change across said D.C. output circuit, and means for at times connecting said diode across the base and emitter of said transistor in such a direction that the voltage appearing across said diode opposes current flow from emitter to base in said transistor.

3. A control circuit for a power source having a control winding that varies the output voltage of said source in response to current flow therethrough comprising, a D.C. output circuit having a pair of output leads connected with said power source, a transistor having a base, emitter and collector, a diode having a substantially constant voltage drop thereacross with varying current flow therethrough, means connecting said transistor, control winding and diode in series circuit relationship with one another and across said output leads, a transistor by-pass circuit including a resistor connected in series with said diode and across said output leads and in shunt with said transistor, means operating in response to the voltage appearing across said output leads for varying the conduction of said transistor including means for rendering said transistor either fully conductive or fully non-conductive, said last-named means including means for connecting said diode across the base and emitter of said transistor in such a direction that the voltage appearing across said diode opposes current flow from emitter to base in said transistor when said transistor is rendered substantially non-conductive.

4. A control circuit for controlling current flow between the output leads of a direct current power source comprising, a transistor having a base, collector and emitter, a circuit element having a substantially constant voltage drop thereacross with varying current flow therethrough, means connecting said transistor and circuit element in series circuit relationship across said output leads, a transistor by-pass cirucit connected in series with said circuit element across said output leads and in shunt with said transistor, means for controlling the conduction of said transistor, and means for at times connecting said circuit element across the base and emitter of said transistor, in such a direction that the voltage appearing across said circuit element opposes current flow from emitter to base in said transistor.

5. A regulating circuit for a power source having a control winding that varies the output voltage of said source in response to current flow therethrough comprising, a D.C. output circuit connected with said power source, a first transistor having a base, emitter and collector, a silicon diode having a substantially unvarying voltage drop thereacross with varying current flow therethrough, a resistor, means connecting said control winding, first transistor, silicon diode and resistor in series across said output circuit with the emitter of said first transistor being connected to one side of said diode and with said control winding being connected between the collector of said first transistor and one side of said output circuit, a second resistor connected between the junction of said first transistor emitter and said diode and said one side of said output circuit, means connecting the collector of said second transistor with the base of said first transistor, and means for controlling the conduction of said second transistor in response to voltage variations across said output circuit.

6. A control circuit for a direct-current power source having a control winding that varies the output voltage of said source in response to current flow therethrough comprising, a D.C. output circuit connected with said power source, first and second transistors each having a base, collector and emitter, means connecting the emitters and collectors of said transistors together so as to connect said transistors in parallel, means connecting said parallel transistors in series with said control winding and across said output circuit whereby the conduction of said transistors controls the current flow in said control winding, first and second resistors having equal resistance values connected respectively to the base of each of said transistors, means connecting the opposite sides of said resistors together and to one side of said output circuit, and means for varying the emitter-to-base current of said transistors in response to variations in voltage across said output circuit.

7. A control circuit for a power source having a control winding that varies the output voltage of said source in response to current flow therethrough comprising, a D.C. output circuit connected with said power source, a first transistor having base, emitter and collector electrodes, a voltage dividing network including a pair of circuit elements having a common junction, means connecting said voltage dividing network, emitter-collector circuit of said first transistor and said control winding in series and across said D.C. output circuit, a second transistor having base, collector and emitter electrodes, means connecting the base electrode of said first transistor with the collector electrode of said second transistor and with a first side of said D.C. output circuit, means connecting the emitter electrode of said second transistor with the junction of said voltage dividing network, a resistor connected directly between the base electrode of said second transistor and the second side of said D.C. output circuit, and means for controlling the conduction of said second transistor in response to changes in voltage across said D.C. output circuit.

8. The circuit according to claim 7 wherein one of the circuit elements of the voltage dividing network is a silicon diode which is connected directly with the emitter electrode of the first transistor.

9. A control circuit for a power source having a control winding that varies the output voltage of said source in response to current flow therethrough comprising, a D.C. output circuit connected with said power source, a first transistor having base, collector and emitter electrodes, a first resistor, means connecting said first resistor, the emitter-collector circuit of said first transistor and said control winding in series across said D.C. output circuit, a second transistor having base, emitter and collector electrodes, means connecting the emitter-collector circuit of said second transistor in shunt with the emitter-base circuit of said first transistor with the emitter electrode of said second transistor being connected between said first resistor and the emitter electrode of said first transistor, a voltage responsive diode, means connecting said voltage responsive diode between the base electrode of said second transistor and said D.C. output circuit, and a second resistor connected between the junction of the base electrode of said second transistor and said voltage responsive diode and one side of said D.C. output circuit.

10. A control circuit for a power source having a control winding that varies the output voltage of said source in response to current flow therethrough comprising, a D.C. output circuit connected with said power source, first and second transistors each having base, collector and emitter electrodes, a first circuit connected across said D.C. output circuit including the emitter-collector circuit of said first transistor, a first resistor and said control winding, a second circuit connected across said D.C. output circuit including said first resistor and the emitter-collector circuit of said second transistor, a voltage responsive diode, means connecting said voltage responsive diode between the base electrode of said second transistor and said D.C. output circuit, a second resistor, means connecting one side of said first and second resistors together and to one side of said D.C. output circuit, and means connecting the opposite side of said second resistor with the junction of said second transistor base electrode and voltage responsive diode.

11. A control circuit for a power source having a control winding that varies the output voltage of said source in response to current flow therethrough comprising, a D.C. output circuit connected with said power source, a first transistor having a base, emitter and collector, a diode having a substantially constant voltage drop thereacross with varying current flow therethrough, means connecting said transistor, control winding and diode in series circuit relationship and across said D.C. output circuit, a second transistor having a base, emitter and collector, means connecting the base of said first transistor with the collector of said second transistor, means connected across said D.C. output circuit and with the base electrode of said second transistor for controlling the conduction of said second transistor solely as a function of the voltage appearing across said output circuit, and means including the emitter-collector circuit of said second transistor for at times connecting said diode across the base and emitter of said first transistor in such a direction that the voltage appearing across said diode opposes current flow in the emitter-base circuit of said first transistor.

12. In an electric circuit for controlling current flow through a circuit element, the combination comprising, a power source, a first transistor, a diode having a substantially constant voltage drop thereacross with varying current flow therethrough, means connecting the emitter-collector circuit of said first transistor, said diode and said circuit element in series with said power source whereby the current flow through said circuit element varies as a function of the emitter-collector conductance of said first transistor, a second transistor, means connecting said first and second transistors with said power source including means for causing said first transistor to become substantially fully conductive when said second transistor is substantially fully nonconductive and for causing said first transistor to become substantially fully nonconductive when said second transistor is substantially fully conductive, means connecting the emitter electrodes of said transistors with opposite sides of said diode, and means connecting the base electrode of said second transistor with one side of said power source, said base electrode of said second transistor being disconnected from said collector electrode of said first transistor.

13. The electric circuit according to claim 12 wherein said diode is a silicon diode.

14. In an electric circuit for controlling current flow through a circuit element, the combination comprising, a power source, a first transistor, a diode having a substantially constant voltage drop thereacross with varying current flow therethrough, means connecting the emitter-collector circuit of said first transistor, said diode and said circuit element in series with said power source whereby the current flow through said circuit element varies as a function of the emitter-collector conductance of said first transistor, a second transistor, means connecting said second transistor with said first transistor and with said power source including means for causing said first transistor to conduct inversely with the conduction of said second transistor, means connecting the emitter-base circuits of said first and second transistors and said diode in a series loop circuit, and means connecting the base electrode of said second transistor with one side of said power source, said base electrode of said second transistor being disconnected from said collector electrode of said first transistor.

15. A control circuit for a power source having a control winding that varies the output voltage of said source in response to current flow therethrough comprising, a D.C. output circuit having a pair of output leads connected with said power source, a transistor having a base, emitter and collector, a diode having a substantially constant voltage drop thereacross with varying current flow therethrough, means connecting said transistor, control winding and diode in series circuit relationship with each other and across said output leads, means connected across said output leads operating solely in response to the voltage appearing across said output leads for varying the conduction of said transistor including means for rendering said transistor either fully conductive or fully nonconductive, said last-named means including means for connecting said diode across the base and emitter of said transistor in such a direction that the voltage appearing across said diode opposes current flow from emitter to base in said transistor when said transistor is rendered substantially nonconductive.

16. A control circuit for a power source having a control winding that varies the output voltage of said source in response to current flow therethrough comprising, a D.C. output circuit connected with said power source, a first transistor having base, emitter and collector electrodes, a diode having a substantially constant voltage drop thereacross with varying current flow therethrough, means connecting said diode, emitter-collector circuit of said first transistor and said control winding in series and across said D.C. output circuit, a second transistor having base, collector and emitter electrodes, means connecting the base electrode of said first transistor with the collector electrode of said second transistor and with a first side of said D.C. output circuit, means connecting the emitter electrode of said second transistor with one side of said diode, a resistor connected directly between the base electrode of said second transistor and the second side of said D.C. output circuit, and means connected across said D.C. output circuit for controlling the conduction of said second transistor solely in response to changes in voltage across said D.C. output circuit.

17. In an electric circuit for controlling the current flow through a circuit element, the combination comprising, a power source, an output circuit energized by said power source, a first transistor having base, emitter and collector electrodes, a semiconductor diode, means connecting said semiconductor diode, said circuit element and the emitter-collector circuit of said first transistor across said output circuit, a second transistor having base, emitter and collector electrodes, means connecting the emitter-collector circuit of said second transistor in parallel with the emitter-collector circuit of said first transistor, means connecting the base electrode of said first transistor with the collector electrode of said second transistor, control means including a Zener diode having one side thereof connected wth the base electrode of said second transistor responsive solely to the voltage of said power source, means connecting opposite sides of said semiconductor diode with the emitter electrodes of said transistors, and a circuit having resistance connecting the junction of said Zener diode and the base electrode of said second transistor with a side of said power source connected with said semiconductor diode.

18. In an electric corcuit for controlling the current flow through a circuit element, the combination comprising, a power source, an output circuit energized by said power source, a first transistor having base, emitter and collector electrodes, a second transistor having base, emitter and collector electrodes, a first circuit connected across said output circuit including said circuit element and the emitter-collector circuit of said first transistor, a second circuit connected across said output circuit including the emitter-collector circuit of said second transistor, means connecting the collector electrode of said second transistor with the base electrode of said first transistor, control means connected across said output circuit and with the base electrode of said second transistor developing a voltage which is proportional to the output voltage of the power source, and means causing said first transistor to be suubstantially fully non-conductive when said second transistor is substantially fully conductive, said last named means including a semiconductor diode connected in said first circuit and connected to cancel the voltage appearing across the emitter-collector circuit of said second transistor.

References Cited in the file of this patent
UNITED STATES PATENTS

| | | |
|---|---|---|
| 2,484,724 | Paradise et al. | Oct. 11, 1949 |
| 2,717,353 | Sewell et al. | Sept. 6, 1955 |
| 2,752,555 | Light | June 26, 1956 |
| 2,809,301 | Short | Oct. 8, 1957 |
| 2,862,175 | Guyton et al. | Nov. 25, 1958 |